United States Patent
Liang et al.

(10) Patent No.: US 12,217,187 B2
(45) Date of Patent: Feb. 4, 2025

(54) METHODS AND SYSTEMS FOR CROSS-DOMAIN FEW-SHOT CLASSIFICATION

(71) Applicants: Hanwen Liang, Thornhill (CA); Peng Dai, Markham (CA); Qiong Zhang, Vancouver (CA); Juwei Lu, North York (CA)

(72) Inventors: Hanwen Liang, Thornhill (CA); Peng Dai, Markham (CA); Qiong Zhang, Vancouver (CA); Juwei Lu, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 995 days.

(21) Appl. No.: 17/204,670

(22) Filed: Mar. 17, 2021

(65) Prior Publication Data
US 2022/0300823 A1    Sep. 22, 2022

(51) Int. Cl.
*G06N 3/00* (2023.01)
*G06N 3/045* (2023.01)
*G06N 3/088* (2023.01)

(52) U.S. Cl.
CPC ............. *G06N 3/088* (2013.01); *G06N 3/045* (2023.01)

(58) Field of Classification Search
CPC ................................ G06N 3/088; G06N 3/045
See application file for complete search history.

(56) References Cited

U.S. PATENT DOCUMENTS

| | | | | |
|---|---|---|---|---|
| 2020/0130177 | A1* | 4/2020 | Kolouri | G06F 18/24 |
| 2022/0058505 | A1* | 2/2022 | Karlinsky | G06N 20/00 |
| 2023/0368038 | A1* | 11/2023 | Shen | G06N 3/086 |
| 2024/0071050 | A1* | 2/2024 | Tao | G06N 20/00 |

FOREIGN PATENT DOCUMENTS

WO    WO-2022159960 A1 *   7/2022  ............. G06F 7/764

OTHER PUBLICATIONS

Few-Shot Classification with Feature Map Reconstruction Networks, Davis Wertheimer et. al, Cornell University, (retrieved at arXiv: 2012.01506v1 [cs.CV], 15 pages, Dec. 2, 2020) (Year: 2020).*

(Continued)

*Primary Examiner* — Barbara M Level

(57) ABSTRACT

Methods, systems, and media for training deep neural networks for cross-domain few-shot classification are described. The methods comprise an encoder and a decoder of a deep neural network. The training of the autoencoder comprises two training stages. For each iteration in the first training stage, a batch of data samples from the source dataset are sampled and fed to the encoder to generate a plurality of source feature maps, then determining a first training stage loss, which updates the autoencoder's parameters. For each iteration in the second training stage, the novel dataset is split into a support set and a query set. The support set is fed to the encoder to determine a prototype for each class label. The query set is also fed to the encoder to calculate a query set metric classification loss. The query set metric classification loss updates the autoencoder's parameters.

18 Claims, 8 Drawing Sheets

(56) References Cited

OTHER PUBLICATIONS

Kaiming He, Xiangyu Zhang, Shaoqing Ren, Jian Sun: Deep Residual Learning for Image Recognition. arXiv preprint arXiv: 1512.03385 Dec. 10, 2015.
LeCun, Yann, et al. 'Gradient-based learning applied to document recognition.' Proceedings of the IEEE 86.11 1998.
Krizhevsky, Alex, Ilya Sutskever, and Geoffrey E. Hinton. 'Imagenet classification with deep convolutional neural networks.' Advances in Neural Information Processing Systems 25 2012.
Szegedy, Christian, et al. 'Going deeper with convolutions.' Proceedings of the IEEE Conference on Computer Vision and Pattern Recognition 2015.
Zeiler, Matthew D., and Rob Fergus. 'Visualizing and understanding convolutional networks.' European Conference on Computer Vision. Springer, Cham 2014.
Guo, Yunhui, et al. 'A Broader Study of Cross-Domain Few-Shot Learning.' European Conference on Computer Vision. Springer, Cham 2020.

* cited by examiner

| Methods | ChestX | ISIC | EuroSAT | CropDisease |
|---|---|---|---|---|
| MatchingNet | 22.40%±0.85% | 36.75%±0.53% | 64.45%±0.63% | 66.39%±0.78% |
| MAML | 23.48%±0.96% | 40.13%±0.58% | 71.70%±0.72% | 78.05%±0.68% |
| ProtoNet | 24.05%±1.01% | 39.57%±0.57% | 73.29%±0.71% | 79.72%±0.67% |
| RelationNet | 22.96%±0.88% | 39.41%±0.58% | 61.31%±0.72% | 68.99%±0.75% |
| MetaOpt | 22.53%±0.91% | 36.28%±0.50% | 64.44%±0.73% | 68.41%±0.73% |
| Transductive Ft | 26.09%±0.96% | 49.68%±0.36% | 81.76%±0.48% | 90.64%±0.54% |
| BSR | 26.84%±0.44% | 54.42%±0.66% | 80.89%±0.61% | 92.17%±0.45% |
| Present disclosure | 27.50%±0.44% | 54.42%±0.65% | 83.26%±0.60% | 93.68%±0.42% |

FIG. 8

METHODS AND SYSTEMS FOR CROSS-DOMAIN FEW-SHOT CLASSIFICATION

FIELD

The present disclosure relates to neural networks, specifically, methods, systems, and media for training deep neural networks for cross-domain few-shot classification.

BACKGROUND

Deep neural networks (DNNs) are large artificial neural networks, which are computational structures used to create and apply models for performing inference tasks. A DNN includes multiple layers of neurons, including an input layer, hidden layers, and an output layer. Each neuron of the layers receives inputs from one or more previous layers, applying a set of weights to the inputs, and combining these weighted inputs to generate an output, which is in turn provided as input to one or more neurons of a subsequent layer. A layer is considered a fully connected layer when there is a full connection between neurons of two adjacent layers. To be specific, for two adjacent layers (e.g., the i-th layer and the (i+1)-th layer) to be fully connected, each and every neuron in the i-th layer must be connected to each and every neuron in the (i+1)-th layer.

In a DNN, a greater number of hidden layers may enable the DNN to model a complicated situation better (e.g., a real-world situation). In theory, a DNN with more parameters is more complex, has a larger capacity (which may refer to a learned model's ability to fit a variety of possible scenarios), and indicates that the DNN can complete a more complex learning task. Training of the DNN is a process of learning the set of weights of all layers of the DNN.

The training is performed on a training dataset. This dataset contains data samples of what the DNN is trained to achieve during the inference task. For instance, if the inference task is to classify types (classes) of flowers, then the training dataset contains an abundance of images of each class for the DNN to learn each class's features. However, there are some instances where only a few data samples of each class are available in the training dataset. Such dataset is named a novel dataset. While DNNs have demonstrated success for many learning tasks ranging from audio recognition to object detection, they require a large dataset, in order of millions of data samples, to train a successful classifier. Therefore, training the DNN on the novel dataset with only a few data samples of each class is not possible with conventional DNN training methods. A general solution is to use another dataset, named a source dataset, which contains a large number of data samples of the same domain as the novel dataset for the DNN to extract features related to the novel dataset. For instance, in the scenario of classifying flowers, the source dataset may be data samples of plants, which are the same domain as flowers. Data samples of plants may contain useful information that can be extracted during training to help classify flowers in the novel dataset.

Still, in many cases, collecting data samples for the novel dataset, or even the source dataset of the same domain as the novel dataset, can be expensive or infeasible. For example, in the inference task of classifying rare diseases in images of a medical domain, there are not enough images of the novel dataset simply because they are rare diseases. Also, there are not enough same domain images, i.e. labelled medical images containing DNN to extract information related to rare disease images. This has become an impediment to utilizing such success of DNNs for applications to classify instances where only a few labelled images for training are available.

Therefore, there is a need for methods, systems, and media to improve classification accuracy when classifying novel datasets.

SUMMARY

In various examples, the present disclosure describes methods, systems, and media for training a classifier to learn classification in a novel dataset, a dataset with only a few data samples available of each class. In particular, methods, systems, and media for learning the novel dataset classes in scenarios where a dataset of the same domain as the novel dataset is not readily available and is difficult or expensive to compile. The methods, systems, and media improve classification accuracy on the novel dataset during inference making.

In some example aspects, the present disclosure describes a method for training an autoencoder comprising an encoder and a decoder of a deep neural network. The method comprises receiving training datasets comprising a source dataset and a novel dataset, each dataset consisting of a plurality of data samples, and each data sample being labelled with a class label. The method trains the autoencoder in two stages, a first training stage and a second training stage.

In the first training stage, and for each training iteration, the method samples a batch of data samples from the source dataset and feeds the batch to the encoder to generate a plurality of source feature maps. Further, the method feeds the plurality of source feature maps to a fully connected layer to predict the class label of each source feature map of the plurality of source feature maps. The method then calculates a source classification loss, which is a first training stage loss. The parameters of the autoencoder are updated using the first training stage loss.

In the second training stage, and for each training iteration, the method splits the novel dataset into a support set and a query set. Further, the method feeds the support set to the encoder to generate a plurality of support set feature maps, then determines a prototype for each class label in the plurality of support set feature maps. Subsequently, the method feeds the query set to the encoder to generate a plurality of query set feature maps, then calculates a query set metric classification loss, which is a second training stage loss. The parameters of the autoencoder are further updated using the second training stage loss.

In some aspects, the first training stage further comprises feeding the plurality of source feature maps to the decoder to reconstruct the respective data sample of each source feature map, generating a source reconstructed dataset, then calculating a source reconstruction loss. Further, the method adds the source reconstruction loss to the first training stage loss.

In some examples, the first training stage further comprises feeding the source reconstructed dataset to the encoder to generate a plurality of source reconstructed feature maps. The method also feeds the plurality of source reconstructed feature maps to the fully connected layer to predict the class label of each source reconstructed feature map of the plurality of source reconstructed feature maps, then calculates a source reconstruction classification loss. Lastly, the method adds the source reconstruction classification loss to the first training stage loss.

In some aspects, the first training stage loss is an aggregated weighted sum of losses comprising it.

In some aspects, the second training stage further comprises feeding the plurality of support set feature maps to the decoder to reconstruct the respective data sample of each support set feature map, generating a support set reconstructed dataset, then calculating a support set reconstruction loss. Also, the method may add the support set reconstruction loss to the second training stage loss.

In one aspect, the second training stage of the method further comprises feeding the plurality of query set feature maps to the decoder to reconstruct the respective data sample of each query set feature map, generating a query set reconstructed dataset, then calculating a query set reconstruction loss. Also, the method may add the query set reconstruction loss to the second training stage loss. In one aspect, the method further comprises feeding the query set reconstructed dataset to the encoder to generate a plurality of query set reconstructed feature maps, then calculating a query set reconstructed metric classification loss. The method may also add the query set reconstructed metric classification loss to the second training stage loss.

In some aspects, the second training stage loss is an aggregated weighted sum of losses comprising it.

In some aspects, at least one of the source reconstructed dataset and the query set reconstructed dataset augments the training datasets.

In some aspects, the novel dataset and the source dataset are of different domains.

In some example aspects, the present disclosure describes a system that includes a memory storing instructions; one or more processors coupled to the memory and configured to execute the instructions to train an autoencoder comprising an encoder and a decoder of deep neural networks. The one or more processors are configured to execute the instructions to receive training datasets comprising a source dataset and a novel dataset, each dataset consisting of a plurality of data samples, each data sample being labelled with a class label. The one or more processors are also configured to execute the instructions to train the autoencoder in two stages, a first training stage and a second training stage.

In the first training stage, and for each training iteration, the one or more processors are configured to execute the instructions to sample a batch of data samples from the source dataset and feed the batch to the encoder to generate a plurality of source feature maps. Further, the one or more processors are also configured to execute the instructions to feed the plurality of source feature maps to a fully connected layer to predict the class label of each source feature map of the plurality of source feature maps, then calculate a source classification loss, which is a first training stage loss. The parameters of the autoencoder are updated using the first training stage loss.

In the second training stage, and for each training iteration, the one or more processors are configured to execute the instructions to split the novel dataset into a support set and a query set. Further, the one or more processors are configured to execute the instructions to feed the support set to the encoder to generate a plurality of support set feature maps, then determine a prototype for each class label from the plurality of support set feature maps. Subsequently, the one or more processors are configured to execute the instructions to feed the query set to the encoder to generate a plurality of query set feature maps, then calculate a query set metric classification loss, which is a second training stage loss. The parameters of the autoencoder are further updated using the first training stage loss.

In some aspects, the one or more processors are further configured for the first training stage to execute the instructions to feed the plurality of source feature maps to the decoder to reconstruct the respective data sample of each source feature map, generating a source reconstructed dataset, then calculate a source reconstruction loss. Further, the one or more processors are configured to execute the instructions to add the source reconstruction loss to the first training stage loss.

In some examples, the one or more processors are further configured for the first training stage to execute the instructions to feed the source reconstructed dataset to the encoder to generate a plurality of source reconstructed feature maps. The one or more processors are configured to execute the instructions to feed the plurality of source reconstructed feature maps to the fully connected layer to predict the class label of each source reconstructed feature map of the plurality of source reconstructed feature maps, then determine a source reconstruction classification loss. Lastly, the one or more processors are configured to execute the instructions to add the source reconstruction classification loss to the first training stage loss.

In some aspects, the first training stage loss is an aggregated weighted sum of losses comprising it.

In some aspects, the one or more processors are further configured for the second training stage to execute the instructions to feed the plurality of support set feature maps to the decoder to reconstruct the respective data sample of each support set feature map, generating a support set reconstructed dataset, then calculate a support set reconstruction loss. Also, the one or more processors are configured to execute the instructions to add the support set reconstruction loss to the second training stage loss.

In one aspect, the one or more processors are further configured for the second training stage to execute the instructions to feed the plurality of query set feature maps to the decoder to reconstruct the respective data sample of each query set feature map, generating a query set reconstructed dataset, then calculate a query set reconstruction loss. Also, the one or more processors are further configured to execute the instructions to add the query set reconstruction loss to the second training stage loss. In other aspects, this one or more processors are further configured to execute the instructions to feed the query set reconstructed dataset to the encoder to generate a plurality of query set reconstructed feature maps, and calculate a query set reconstructed metric classification loss. The one or more processors may further be configured to execute the instructions to add the query set reconstructed metric classification loss to the second training stage loss.

In some aspects, the second training stage loss is an aggregated weighted sum of the weights comprising it.

In one aspect, at least one of the source reconstructed dataset and the query set reconstructed dataset augments the training datasets.

In some aspects the present disclosure describes a computer-readable medium having instructions tangibly stored thereon, wherein the instructions, when executed by a processing unit, causes the processing unit to perform any of the methods described herein.

BRIEF DESCRIPTION OF THE DRAWINGS

Reference will now be made, by way of example, to the accompanying drawings, which show example embodiments of the present application, and in which:

FIG. 8 is a table of an example experiment evaluating the autoencoder of FIG. 3 and comparing performance against other methods, in accordance with an example embodiment;

Similar reference numerals may have been used in different figures to denote similar components.

DESCRIPTION OF EXAMPLE EMBODIMENTS

Figure 1:
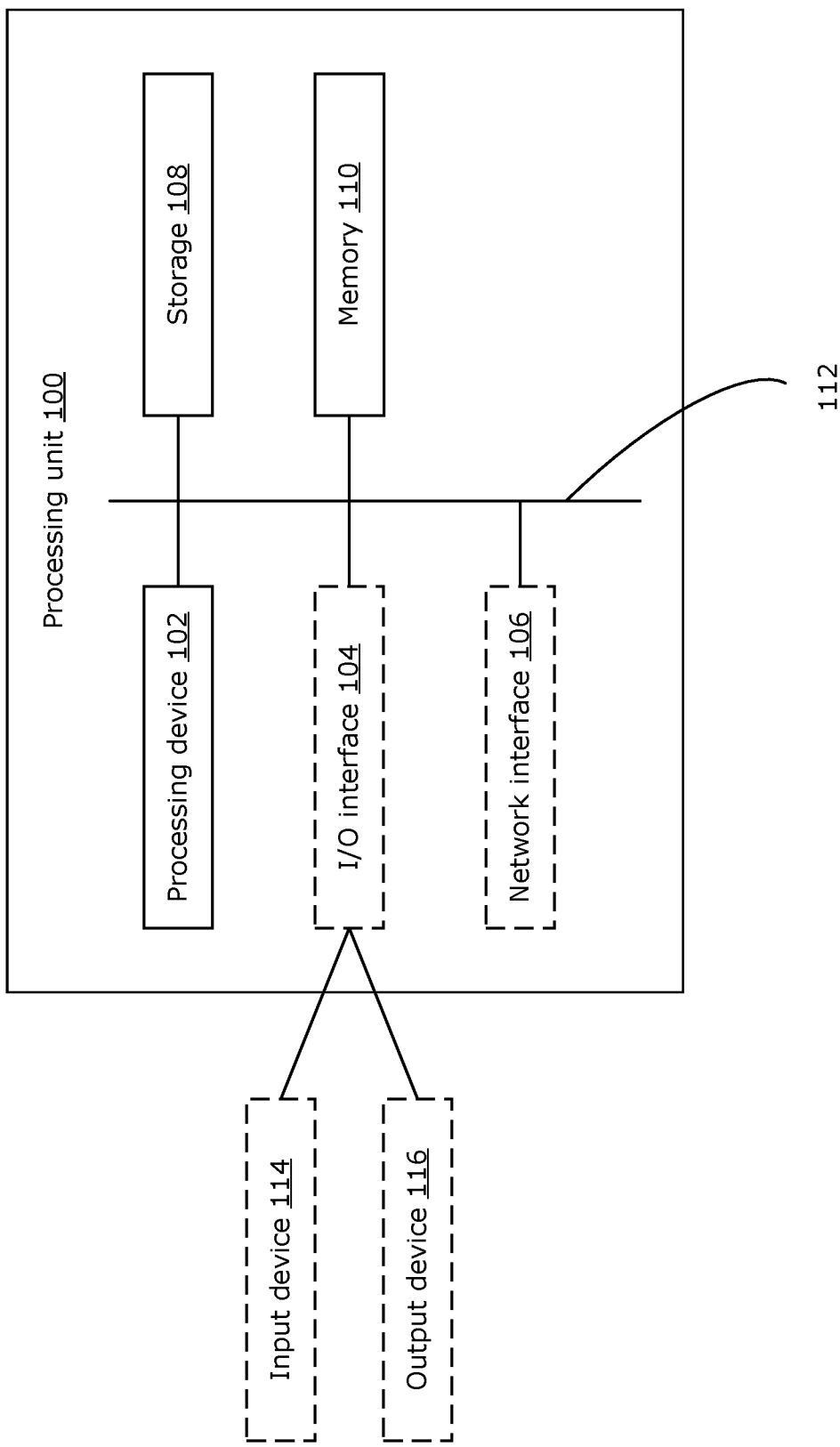
FIG. 1 is a block diagram of an example processing system that may be used to implement examples described herein.

Methods, systems, and media for training a DNN with datasets of a source dataset and a novel dataset for classifying novel dataset classes, a few-shot classification task, are described herein. The novel dataset contains classes with only a few labelled data samples. These methods, systems, and media are instrumental in scenarios where the source dataset is of a different domain (cross-domain) from the novel dataset. The methods, systems, and media disclose training an autoencoder for the cross-domain few-show classification task. The autoencoder comprises an encoder implementing a residual neural network and a decoder implementing a lightweight convolutional neural network.

Training of a DNN adjusts the parameters of each neuron, including weights and biases (if any). An example algorithm used to train the DNN is backpropagation. Backpropagation is used to adjust (also referred to as update) a value of a parameter (e.g., a weight) in the DNN so that the error (or loss) in the output becomes smaller. For example, a defined loss function, such as minimum square error (MSE), is calculated through forward propagation of an input to an output of the DNN, and a gradient algorithm (e.g., gradient descent) is used to update the parameters to reduce the loss function. This process is done iteratively and is referred to as "tuning". With each iteration, called an epoch, the MSE decreases until the parameters of the DNN are optimized. After the DNN is trained, the weights and biases (if any) are fixed, and may be used in real-time operations to predict output values, in other words, make inferences. It is to be understood that other DNN training methods may replace backpropagation with another method. Backpropagation is an example, not intended to be a limitation, and provided for illustration only. Other training methods may include difference target propagation, Hilbert-Schmidt independence criterion, online alternating minimization.

Example embodiments disclose training an autoencoder to classify novel dataset classes. The novel dataset generally does not have enough data samples to train a DNN to achieve a desired inference accuracy. For instance, while there is a multitude of rare diseases, there are only a few data samples (images, in this scenario) of each. There are not enough data samples of each rare disease to train a DNN classifier. It is also challenging, and may not be practical, to collect a source dataset of the same domain as the novel dataset with enough labelled data samples to train the DNN; in this scenario, the same domain source dataset may be a large number of medical images.

When the source dataset is of the same domain as the novel dataset or cross-domain, i.e. different domain, the autoencoder undergoes two stages of training: a pretraining stage and a fine-tuning stage. Example embodiments herein describe the scenario where a cross-domain dataset is used, but it is to be understood that the same methods, systems, and media are applicable when the source dataset is of the same domain as the novel dataset.

The pretraining stage uses the source dataset and calculates a pretraining stage loss, which aggregates three weighted losses: a source classification loss, a source reconstruction loss, and a source reconstruction classification loss. In every training iteration, the pretraining stage loss updates the weights and biases (if any) of the autoencoder until a termination condition is satisfied. Once the termination condition is satisfied, the pretraining stage halts and the fine-tuning stage starts. The fine-tuning stage uses the novel dataset to tweak the autoencoder's parameters learned in the pretraining stage. The fine-tuning stage splits the novel dataset into a support set and a query set. The support set is fed to the autoencoder, and a prototype for each class in the support set is determined. Also, a support set reconstruction loss is calculated. Further, the query set is fed to the autoencoder, and three losses are calculated—a query set metric classification loss, a query set reconstructed metric classification loss, and a query set reconstruction loss. The three losses from the query set and the one loss from the support set are weighted and summed, determining a fine-tuning stage loss, which is used to update the weights and biases (if any) of the autoencoder.

A list of commonly used abbreviations:

| | |
|---|---|
| DNN | Deep neural network |
| NN | Neural network |
| MSE | Minimum squared error |
| $f_\phi$ | Feature map |
| $f_\phi^h$ | Highest level feature map, the last feature map of the encoder |
| S | Set of data |
| $Class_N$ | A prototype for class N of the novel dataset |
| L | Loss |
| $L_{pretraining}$ | Total loss of an iteration in the pretraining stage |
| $L_{fine-tuning}$ | Total loss of an iteration in the fine-tuning stage |
| $L_m$ | Metric classification loss |
| src | Source |
| rec | Reconstructed |

FIG. 1 is a block diagram of an example simplified processing unit 100, which may be part of a system used to implement the autoencoder in accordance with examples disclosed herein to perform the specific task for which it has been trained. It may also be used to execute a DNN machine-executable instruction to perform a specific task (e.g., inference task) based on software implementation. Other processing units suitable for implementing embodiments described in the present disclosure may be used, which may include components different from those discussed below. Although FIG. 1 shows a single instance of each component, there may be multiple instances of each component in the processing unit 100.

The processing unit 100 may include one or more processing devices 102, such as a processor, a microprocessor, an application-specific integrated circuit (ASIC), a field-programmable gate array (FPGA), or combinations thereof. The one or more processing devices 102 may also include other processing units (e.g. a Neural Processing Unit (NPU), a tensor processing unit (TPU), and/or a graphics processing unit (GPU)).

Optional elements in FIG. 1 are shown in dashed lines. The processing unit 100 may also include one or more optional input/output (I/O) interfaces 104, which may enable interfacing with one or more optional input devices 114 and/or optional output devices 116. In the example shown, the input device(s) 114 (e.g., a keyboard, a mouse, a microphone, a touchscreen, and/or a keypad) and output device(s) 116 (e.g., a display, a speaker and/or a printer) are shown as optional and external to the processing unit 100. In other examples, one or more of the input device(s) 114 and/or the output device(s) 116 may be included as a component of the processing unit 100. In other examples, there may not be any input device(s) 114 and output device(s) 116, in which case the I/O interface(s) 104 may not be needed.

The processing unit 100 may include one or more optional network interfaces 106 for wired (e.g. Ethernet cable) or wireless communication (e.g. one or more antennas) with a network (e.g., an intranet, the Internet, a P2P network, a WAN and/or a LAN).

The processing unit 100 may also include one or more storage units 108, which may include a mass storage unit such as a solid-state drive, a hard disk drive, a magnetic disk drive and/or an optical disk drive. The storage unit 108 stores databases used for training the autoencoder. The processing unit 100 may include one or more memories 110, which may include a volatile or non-volatile memory (e.g., a flash memory, a random access memory (RAM), and/or a read-only memory (ROM)). The non-transitory memory(ies) 110 may store instructions for execution by the processing device(s) 102 to implement the autoencoder, equations, and algorithms described in the present disclosure. The memory(ies) 110 may include other software instructions, such as implementing an operating system and other applications/functions.

In some other examples, one or more data sets and/or modules may be provided by an external memory (e.g., an external drive in wired or wireless communication with the processing unit 100) or may be provided by a transitory or non-transitory computer-readable medium. Examples of non-transitory computer-readable media include a RAM, a ROM, an erasable programmable ROM (EPROM), an electrically erasable programmable ROM (EEPROM), a flash memory, a CD-ROM, or other portable memory storage.

There may be a bus 112 providing communication among components of the processing unit 100, including the processing device(s) 102, optional I/O interface(s) 104, optional network interface(s) 106, storage unit(s) 108 and/or memory(ies) 110. The bus 112 may be any suitable bus architecture, including, for example, a memory bus, a peripheral bus or a video bus.

Figure 2:
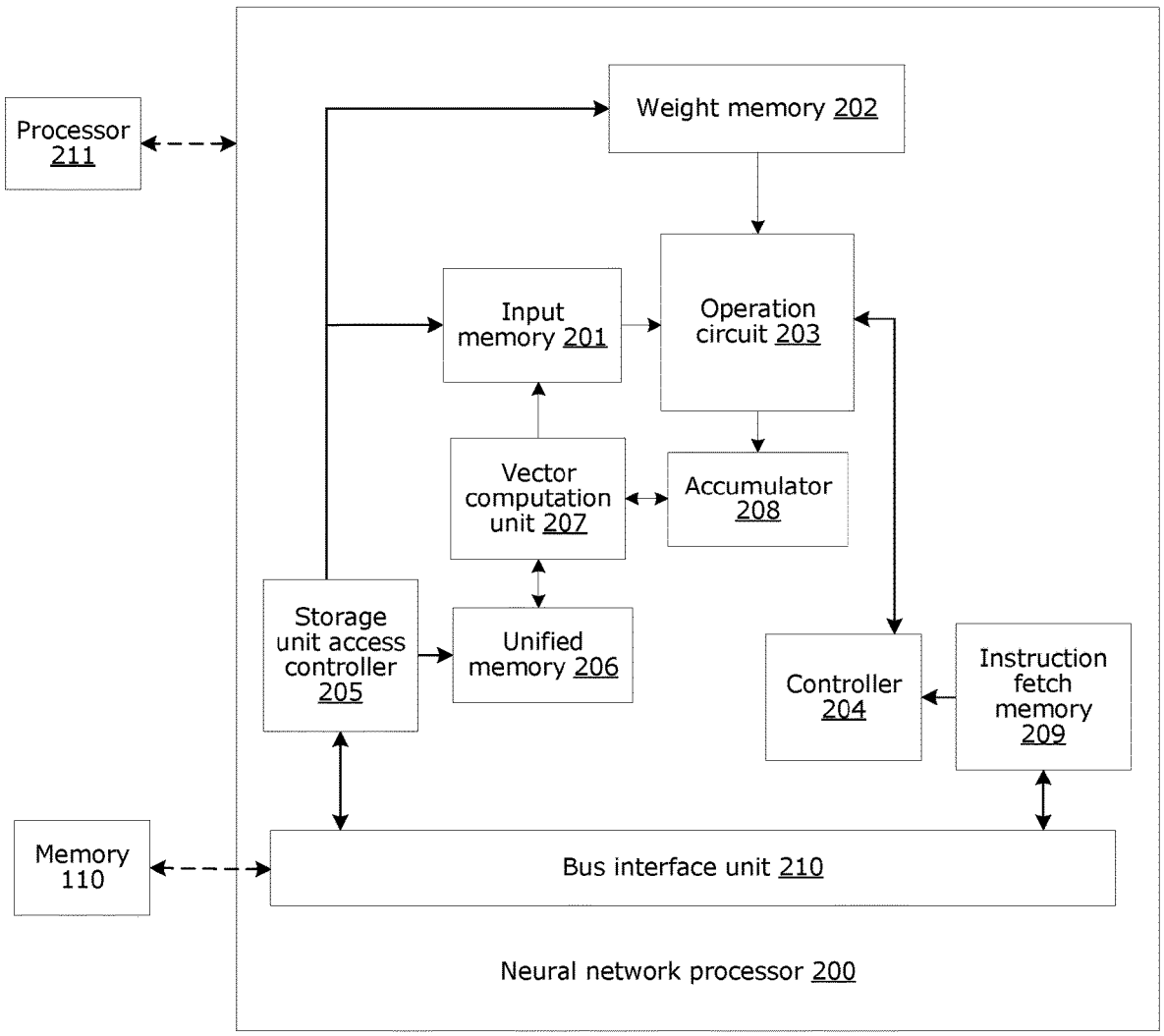
FIG. 2 is a block diagram illustrating an example hardware structure of a neural network processor, in accordance with an example embodiment.

FIG. 2 is a block diagram illustrating an example hardware structure of an example neural network (NN) processor 200 of the processing device 102 to implement an autoencoder and train it according to some example embodiments of the present disclosure. The NN processor 200 may be provided on an integrated circuit (also referred to as a computer chip). All the algorithms of the layers of the autoencoder may be implemented in the NN processor 200.

The processing device 102 (FIG. 1) may include a processor 211 and the NN processor 200. The NN processor 200 may be any processor that can perform NN computations, for example, a Neural Processing Unit (NPU), a tensor processing unit (TPU), a graphics processing unit (GPU), or the like. The NPU is used as an example. The NPU may be mounted, as a coprocessor, to the processor 211, and the processor 211 allocates a task to the NPU. A core part of the NPU is an operation circuit 203. A controller 204 controls the operation circuit 203 to extract matrix data from memories (201 and 202) and perform multiplication and addition operations.

In some implementations, the operation circuit 203 internally includes a plurality of processing units (Process Engine, PE). In some implementations, the operation circuit 203 is a bi-dimensional systolic array. Besides, the operation circuit 203 may be a uni-dimensional systolic array or another electronic circuit that can implement a mathematical operation such as multiplication and addition. In some implementations, the operation circuit 203 is a general matrix processor.

For example, it is assumed that there are an input matrix A, a weight matrix B, and an output matrix C. The operation circuit 203 obtains, from a weight memory 202, weight data of the matrix B and caches the data in each PE in the operation circuit 203. The operation circuit 203 obtains input data of the matrix A from an input memory 201 and performs a matrix operation based on the input data of the matrix A and the weight data of the matrix B. An obtained partial or final matrix result is stored in an accumulator (accumulator) 208.

A unified memory 206 is configured to store input data and output data. Weight data is directly moved to the weight memory 202 by using a storage unit access controller 205 (Direct Memory Access Controller, DMAC). The input data is also moved to the unified memory 206 by using the DMAC.

A bus interface unit (BIU, Bus Interface Unit) 210 is used for interaction between the DMAC and an instruction fetch memory 209 (Instruction Fetch Buffer). The bus interface unit 210 is further configured to enable the instruction fetch memory 209 to obtain an instruction from the memory 110, and is further configured to enable the storage unit access controller 205 to obtain, from the memory 110, after loading from the storage unit 108, data of the input matrix A or the weight matrix B.

The DMAC is mainly configured to move input data from memory 110 Double Data Rate (DDR) to the unified memory 206, or move the weight data to the weight memory 202, or move the input data to the input memory 201.

A vector computation unit 207 includes a plurality of operation processing units. If needed, the vector computation unit 207 performs further processing, for example, vector multiplication, vector addition, an exponent operation, a logarithm operation, or magnitude comparison, on an output from the operation circuit 203. The vector computation unit 207 is mainly used for computation at a layer of a DNN. Specifically, it may perform processing on computation. For example, the vector computation unit 207 may apply a nonlinear activation function to an output matrix generated by the operation circuit 203, for example, a vector of an accumulated value, to generate an output value for each neuron of the next DNN layer.

In some implementations, the vector computation unit 207 stores a processed vector to the unified memory 206. The instruction fetch memory 209 (Instruction Fetch Buffer)

connected to the controller 204 is configured to store an instruction used by the controller 204.

The unified memory 206, the input memory 201, the weight memory 202, and the instruction fetch memory 209 are all on-chip memories. The memory 110 is independent of the hardware architecture of the NPU.

Figure 3:
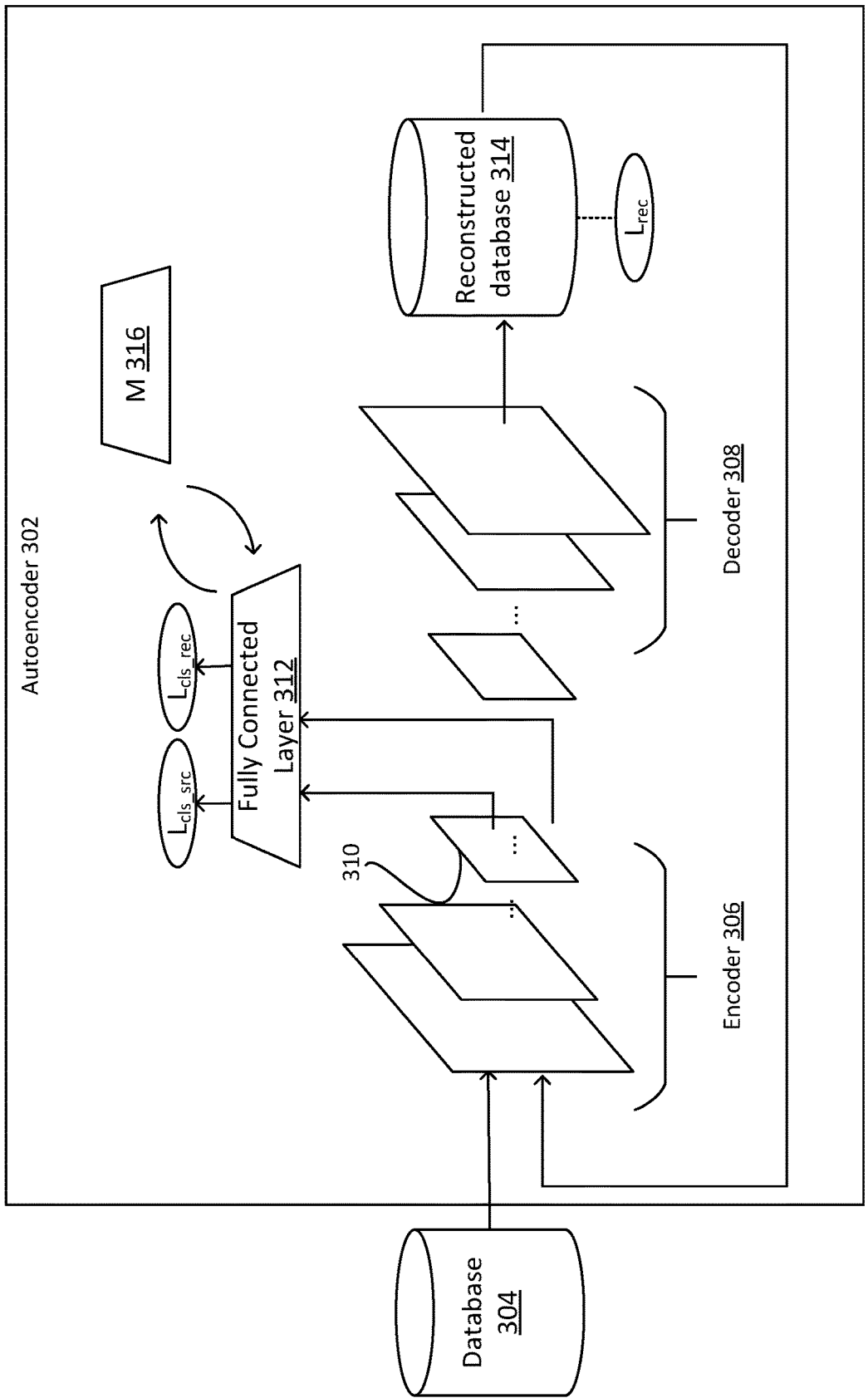
FIG. 3 is a block diagram of an example framework for training a DNN to learn classes with only few labelled data samples, in accordance with an example embodiment.

FIG. 3 is a block diagram of an example training framework of an autoencoder for a few-shot classification task, in accordance with example embodiments. Operations of the autoencoder 302 are performed by the NN processor 200. The autoencoder 302 receives input from memory 110 for a database 304, stored in the storage 108 of the processing unit 100, and outputs the autoencoder 302 model parameters required for an inference task, the few-shot classification task. The parameters comprise weights and biases (if any). The autoencoder 302 has an encoder-decoder architecture, such that the i-th+1 layer may generate an output smaller than than the i-th layer's output; however, the i-th+1 layer of the decoder may generate an output larger than the i-th layer's. It is understood that the encoder-decoder architecture may be symmetric such that there is a decoding layer mirroring every encoding layer. It is also understood that the encoder-decoder architecture may be asymmetric such that the encoder and the decoder may mirror each other, but the input to the encoder and the output of the decoder are of the same size.

The encoder 306 and decoder 308 of the autoencoder 302 are two convolutional neural networks (CNNs). A CNN is a DNN with a convolutional structure. The CNN includes a feature extractor consisting of a convolutional layer. The feature extractor may be a filter, which is a trainable filter. A convolution process may be considered as performing convolution on a two-dimensional (2D) input data sample (image) or a convolutional feature map using the trainable filter.

The layer is a layer of neurons at which convolution processing is performed on an input in the CNN. That is, a layer generally is not a fully connected layer. Each layer usually includes at least a plurality of trainable filters, stride, and padding, and it generates a plurality of feature maps $f_\phi$, depending on the number of trainable filters. There are two types of layers, convolutional layers and deconvolutional layers. They are internally very similar, but the stride works differently.

The layer parameters stride and padding set how the trainable filters convolve with input to the layer. Stride, in convolutional layers, corresponds to the convolutional step size for convolving the trainable filter with the input of the layer. A stride of 1 means the trainable filter moves one pixel at a time, not skipping any pixels. A stride of 2 means the trainable filters move two pixels at a time, skipping one pixel at a time, hence, reducing the size of the input of the layer to half, depending on the padding. Padding corresponds to appending the input of the layer with a desired number of pixels around the input to increase its size. For instance, padding of 1 means adding a set of pixels of one-pixel width, usually of a value of 0, around the input's perimeter. Deconvolutional layers are the same, but the stride increases the size of the input by a factor of the stride. For instance, stride 2 in deconvolution layers doubles the size of the input by injecting a pixel, usually of a value of 0, between every two pixels instead of skipping a pixel as in the convolutional layers.

Each filter (trainable filter) generates a feature map $f_\phi$, which is the output of the layer. Each filter comprises one or more kernels, which contain weights for extracting features from input of the layer. The number of kernels of a filter is equal to the number of channels of the input of the layer. A hidden principle behind convolutional layers is that statistical information of a part of a data sample is the same as that of another part of the data sample. This means that data sample information learned from one part of the data sample may also be applicable to another part of the data sample. Generally, a larger quantity of kernels indicates that richer data sample information is reflected by a convolution operation.

A kernel may be initialized as a 2D matrix of random values. In a training process of the CNN, the weights of the kernel are learned. An advantage of using the kernel to share weights among neurons in the same feature map is that the connections between layers of the CNN is reduced (compared to the fully connected layer) and the risk of overfitting is lowered.

In the process of training a CNN, a predicted value outputted by the DNN may be compared to a desired target value (e.g., a ground-truth value). The kernels of a filter (which carries weights for a given layer) of each layer of the DNN are updated based on a difference between the predicted value and the desired target value. For example, if the predicted value outputted by the DNN is excessively high, the weights of the kernels for each layer may be adjusted to lower the predicted value. This comparison and adjustment may be carried out iteratively until a convergence condition is met (e.g., a predefined maximum number of iterations has been performed, or the predicted value outputted by the CNN is sufficiently converged with the desired target value). A loss function or an objective function is defined as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the DNN is to minimize the loss function.

Backpropagation is an algorithm for training a CNN, the autoencoder 302 in example embodiments. Backpropagation is used to adjust (also referred to as update) a value of a parameter (e.g., a weight) in the autoencoder 302, so that the error (or loss) in the output becomes smaller. For example, a defined loss function is calculated from forward propagation of an input to an output of the autoencoder 302. Backpropagation calculates a gradient of the loss function with respect to the parameters of the autoencoder 302, and a gradient algorithm (e.g., gradient descent) is used to update the parameters to reduce the loss function. Backpropagation is performed iteratively so that the loss function is converged or minimized.

The encoder 306, which is a CNN, may consist of several layers for generating an output decreasing in size. Each layer of the encoder 306 maps its respective input to a respective feature map, denoted as $f_\phi^l$ 310 (only the deepest feature map is labelled) where l is the level of the encoding layer (with l=1 being the most shallow layer). Each feature map $f_\phi^l$ 310 may be of different size and encodes feature information of a respective different contextual scope. The shallowest layer produces the largest feature map $f_\phi^1$ 310 and encodes the lowest-level (details) features. The deepest layer produces the highest-level feature map (denoted simply $f_\phi^h$ 310) that is the smallest and encodes the highest-level features. The decoder 308 is of the opposite architecture of the encoder 306. The feature map $f_\phi^1$ 310 of the decoder 308 is the deepest layer, decoding the highest-level features, and the shallowest layer, decoding the lowest-level (the details) features.

Input to the encoder is a set of data samples from the database 304, containing the source dataset and the novel dataset. The encoder 306 comprises a plurality of layers that encode the input to feature maps $f_\phi$ 310 in a latent feature space, the feature map $f_\phi$ of the last layer of the encoder 306 is $f_\phi^h$ 310 (which is labelled in FIG. 3). There is a plurality of layers that decode the deepest feature map $f_{99}^h$ 310 to reconstruct the input data samples and generate a reconstructed dataset, stored in reconstructed database 314. Hereinafter, for simplicity, references to the term feature map $f_\phi$ refer to the highest level feature map $f_\phi^h$.

Training the autoencoder 302 is performed in two stages: a pretraining stage and a fine-tuning stage.

Pretraining Stage

The pretraining stage is a coarse type of training where the source dataset, labelled data samples stored in database 304, is used. Example embodiments use a source dataset of a different domain from the novel dataset. A batch of a prespecified batch size of the source data samples is sampled and fed to the autoencoder 302 for training. The encoder 306 generates a feature map $f_\phi^h$ 310 for each data sample, which is fed to a fully connected layer 312 configured to transfer the feature map $f_\phi^h$ 310 to probabilities of being each class label of the source dataset classes.

The fully connected layer 312 is a NN. It receives $f_\phi^h$ 310, the output of the encoder 306. The NN processor 200 flattens $f_\phi^h$ 310 into a vector for input to the NN of the fully connected layer 312. This NN is a fully connected NN with an input layer, one or more hidden layers, and an output layer. The number of neurons of the output layer is equal to the number of classes of the source dataset classes. The output of the last hidden layer is passed through a softmax function, obtaining the probability that the flattened vector of $f_\phi^h$ 310 belongs to each class of the source dataset classes. The advantage of using a softmax function is that it turns logits into probabilities by taking the exponents of each logit then normalizing it by the sum of these exponents so that all probabilities add up to one. The weights and biases (if any) of the fully connected layer 312 are updated during the autoencoder 302 training.

The predicted class label of $f_\phi^h$ 310 is the class label of the softmax function's output values with the highest probability. The source classification loss ($L_{cls-src}$) can be computed as in equation (1) below:

$$L_{cls-src} = \frac{1}{n}\sum_{i}^{n}(y_{src}^i - \hat{y}_{src}^i)^2 \quad (1)$$

where $y_{src}^i$ is the class label of the i-th data sample of n data samples of the source dataset of the batch fed to the autoencoder 302, and $\hat{y}_{src}^i$ is the predicted class label determined by the fully connected layer 312.

The feature maps $f_\phi^h$ 310 of the source dataset are also fed to the decoder 308 to reconstruct the respective data samples, generating the source reconstructed dataset stored in the reconstructed database 314. The source reconstructed dataset is fed to the autoencoder 302, then to the fully connected layer 312, predicting the class label of each data sample of the source reconstructed dataset. The source reconstruction classification loss ($L_{cls-rec}$) is calculated for the source reconstructed dataset after predicting the class labels of each of its data samples. $L_{cls-rec}$ is computed as in equation (2) below.

$$L_{cls-rec} = \frac{1}{n}\sum_{i}^{n}(y_{rec}^i - \hat{y}_{rec}^i)^2 \quad (2)$$

where $y_{rec}^i$ is the class label of the i-th data sample of n data samples of the source reconstructed dataset, and $\hat{y}_{rec}^i$ is the predicted class label determined by the fully connected layer 312.

In example embodiments, the source reconstructed dataset is also stored in the database 304, augmenting the available pretraining stage dataset (the source dataset).

Further, the source reconstructed dataset is compared to its respective data samples in the source dataset to determine the source reconstruction loss $L_{src-rec}$. $L_{src-rec}$ can be calculated as in equation (3) below.

$$L_{src-rec} = \frac{1}{n}\sum_{i}^{n}(x^i - x_{rec}^i)^2 \quad (3)$$

where $x^i$ is i-th of n data samples of the source dataset of the batch fed to the autoencoder 302, and $x_{rec}^i$ is the respective autoencoder's 302 reconstructed data sample, which is a data sample of the source reconstructed dataset.

Therefore, the pretraining stage includes calculating a pretraining stage loss, which is backpropagated to every layer of the autoencoder 302 to update weights and biases (if any). The pretraining stage loss comprises three losses: a source classification loss ($L_{cls-src}$), a source reconstruction classification loss ($L_{cls-rec}$), and a source reconstruction loss ($L_{src-rec}$). The pretraining stage loss is a weighted aggregate of the three losses as in equation (4) below.

$$L_{pretraining} = \lambda_1 L_{cls-src} + \lambda_2 L_{cls-rec} + \lambda_3 L_{src-rec} \quad (4)$$

where $\lambda_1$, $\lambda_2$, and $\lambda_3$ are weights chosen to emphasize on the losses they are multiplied with. The autoencoder's 302 weights and biases (if any) are updated using stochastic gradient descent, which is part of the backpropagation training framework. All three losses are MSE. This pretraining stage continues its iterations until a termination condition is satisfied, which indicates the starting of the fine-tuning stage of the training.

It is to be understood, while MSE and stochastic gradient descent may be used, other error functions and optimization methods may be equally applicable. MSE and gradient descent should not be considered as a limitation and are presented as an example.

Figure 4:
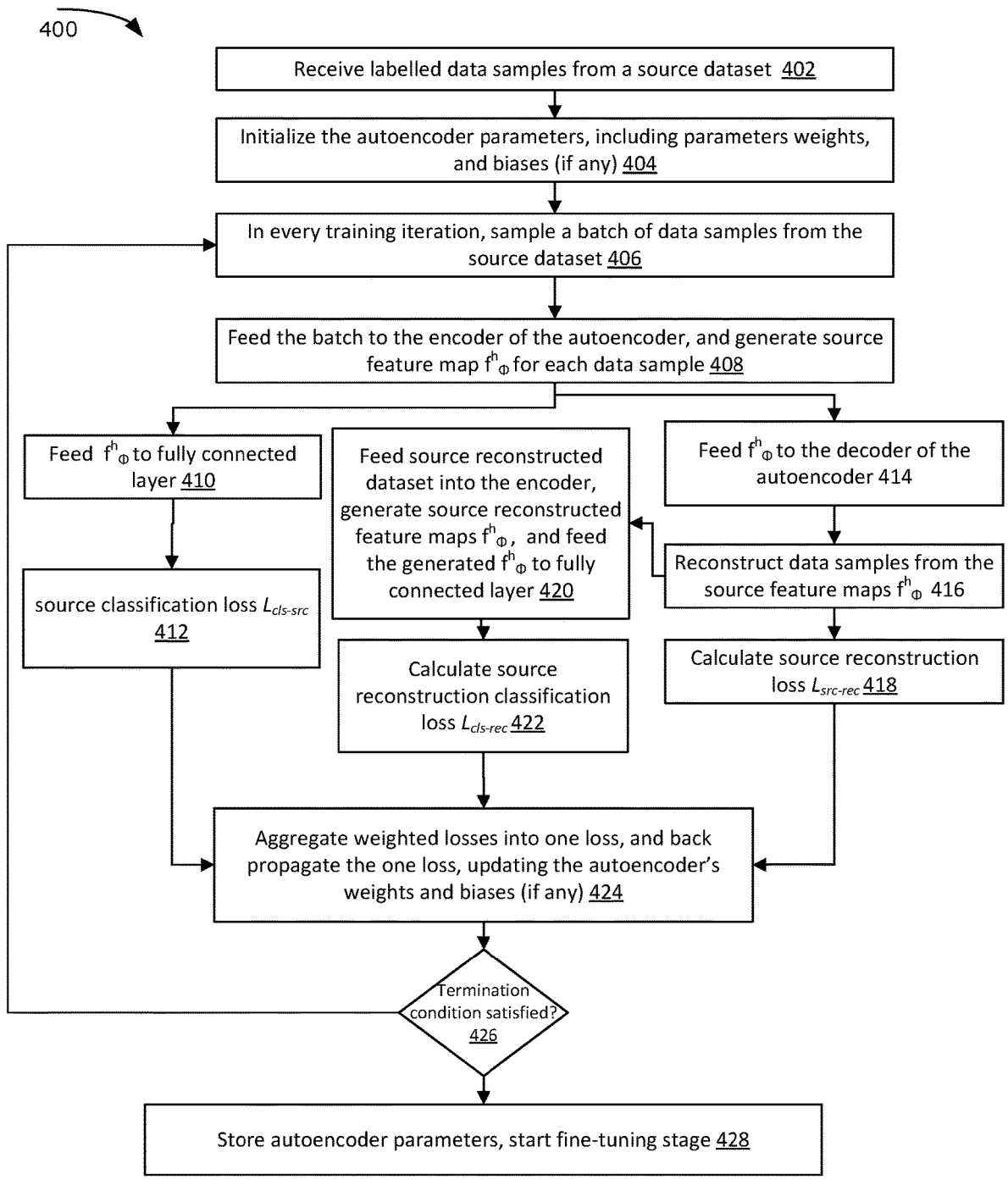
FIG. 4 is a flowchart of an example pretraining stage method for an autoencoder's training for a few-shot classification task, in accordance with an example embodiment.

FIG. 4 is a flowchart of an example pretraining stage method of the autoencoder 302, according to example embodiments. The first stage of training the autoencoder 302 is the pretraining stage, implemented by the pretraining stage method 400. The method 400 starts by receiving labelled data samples from a source dataset 402 stored in the database 304 and loaded in memory 110. The data samples are labelled such that each data sample has a class label. The method 400 initializes the autoencoder 302, including the layers and their filters' parameters, such as weights and biases (if any) 404.

The pretraining stage starts by sampling, in each training iteration, a batch of data samples from the source dataset 406. A training iteration, which may also be referred to as an epoch, includes the operation of propagating the input (data samples) through the autoencoder 302 from its input layer to its output layer through forward propagation. Once the data samples are forward propagated, losses are calculated then back-propagated from the output layer to the input layer, updating the weights and biases (if any) of the autoencoder 302.

The encoder 306 outputs a source feature map $f_\phi^h$ 310 for each data sample of the batch 408. At block 410, the method 400 feeds the source feature maps $f_\phi^h$ 310 into a fully connected layer 312, to classify each source feature map $f_\phi^h$ 310 into a class, i.e. predict its class label. The method 400 then calculates the source classification loss $L_{cls\text{-}src}$ as in equation (1), which is the MSE between the source data samples and the fully connected layer 312 predictions 412.

The method 400 also feeds the source feature map $f_\phi^h$ 310 of each data sample of the batch to the decoder 308 at block 414 for processing. The decoder 308 is configured to reconstruct every data sample from its feature map, generating a source reconstructed dataset 314, stored in reconstructed database 314 at block 416. The method 400 calculates source reconstruction loss $L_{src\text{-}rec}$ as in equation (3) by calculating the MSE between the source data samples in the batch and the respective reconstructed data sample in the source reconstructed dataset 418.

The source reconstructed dataset at block 416 are also added to the pretraining stage dataset (source dataset) stored in database 304 and fed to the encoder 306 to generate source reconstructed feature maps $f_\phi^h$ 310. $f_\phi^h$ 310 of the source reconstructed dataset are passed to the fully connected layer 312 at block 420, where the source reconstruction classification loss $L_{cls\text{-}rec}$ is determined as in equation (2) above 422. The source reconstruction classification loss $L_{cls\text{-}rec}$ is the MSE between class labels of the source reconstructed dataset and their respective fully connected layer 312 predicted class labels.

All three losses ($L_{cls\text{-}src}$, $L_{cls\text{-}rec}$, $L_{src\text{-}rec}$) are weighted and aggregated, determining the pretraining stage loss ($L_{pretraining}$), which is backpropagated, updating the autoencoder's 302 weights and biases (if any) 424. The method 400 continues training in the pretraining stage if the termination condition is not satisfied 426. There are several methods to specify termination conditions. In this embodiment, the termination condition is satisfied when a prespecified number of epochs is reached. Example embodiments may determine the termination condition when a prespecified loss is reached. If the termination condition is satisfied 426, the pretraining stage halts, and the method 400 stores the autoencoder's 302 parameters in storage 108 and indicates the beginning of the fine-tuning stage 428.

Referring back to FIG. 3, the training framework starts with the pretraining stage, then once completed, the fine-tuning stage starts, which tweaks the parameters (weights and biases (if any)) of the encoder 306 and decoder 308 learned during the pretraining stage.

Fine-Tuning Stage

The second training stage is the fine-tuning stage. It is configured to learn and update parameters of the autoencoder 302 for the task of classifying classes of a novel dataset rather than the source dataset. It uses the parameters of the autoencoder 302 learned during the pretraining stage and fine-tunes them using the novel dataset. The metric loss computation unit (M) 316 is used instead of the fully connected layer 312. The metric loss computation unit 316 is configured to calculate a metric classification loss (described in detail below).

The novel dataset, which is used in the fine-tuning stage, may consist of a significantly smaller dataset than the source dataset. It contains a few shots of every class. In example embodiments, the novel dataset contains 5 classes, each with 10 data samples.

The problem is formulated as an "N-way K-shot" problem, which means the autoencoder 302 is tasked to discriminate between N different classes, with K labelled data samples of each class. The fine-tuning stage includes splitting the novel dataset into two disjoint sets, a support set $S_{support}$ and a query set $S_{query}$. $S_{support}$ is the training set of the novel dataset, and the $S_{query}$ is the evaluation set of the novel dataset to measure the performance of the autoencoder 302 trained on $S_{support}$. $S_{query}$ and $S_{support}$ sets are disjoint such that no data sample is shared between the sets.

$S_{support}$ is fed to the encoder 306 of the autoencoder 302, which is initially trained in the pretraining stage with a source dataset of a different domain than the novel dataset. The encoder generates a support set feature map $f_\phi^h$ 310 for each data sample of $S_{support}$. The data samples of $S_{support}$ are labelled, so it is known which class of the N classes the support set feature map $f_\phi^h$ 310 belong to. Once the support set feature maps $f_\phi^h$ 310 of $S_{support}$ is determined, the metric loss computation unit 316 computes a prototype for each class of the N classes, $Class_N$. The prototype of a class is the average of the support set feature maps $f_{99}^h$ 310 of class N. It is computed as follows in equation (5).

$$Class_N = \frac{1}{|S_N|} \sum_{(x_i, y_i) \in S_N} f_\phi^h(x_i) \qquad (5)$$

where $S_N$ is a subset of $S_{support}$ with data samples of the same class, $|S_N|$, is the number of data samples in $S_N$, $x_i$ is data sample i from the subset $S_N$, and $y_i$ is the class label of the data sample $x_i$.

Each support set feature map $f_\phi^h$ 310 of $S_{support}$ is fed to the decoder 308 to reconstruct its respective data sample ($x_{rec}$), generating a support set reconstructed dataset, stored in reconstructed database 314. Further, the support set reconstruction loss is computed for the support set reconstructed dataset as in equation (6) below.

$$L_{support\text{-}rec} = \frac{1}{n} \sum_i^n (x^i - x_{rec}^i)^2 \qquad (6)$$

where $x^i$ is i-th data samples of $S_{support}$ and $x_{rec}^i$ is $x^i$'s respective element in the support set reconstructed dataset.

After determining the prototypes of all classes, $S_{querry}$ is fed to the encoder 306, and the distance between every generated query set feature map $f_\phi^h$ 310 of $S_{querry}$ and its respective prototype of $Class_N$ is computed by the metric loss computation unit 316 to determine the likelihood of each query set feature map $f_\phi^h$ 310 belongs to its correct class. The distance is computed as $d(f_\phi^h(x^i), Class_N)$, d is the distance $f_\phi^h(x^i)$ is the query set feature map of a query set data sample ($x^i$) in $S_{querry}$ and $Class_N$ is the prototype of each query set feature map's $f_\phi^h$ 310 class label. The negative log-likelihood is further computed as $\exp(-d(f_\phi^h(x), Class_N))$.

The distance (d) may be Euclidean distance, Manhattan distance, or other distances. The metric classification loss of data sample $x^i$ ($L_m^i$) is computed as in equation (7) below.

$$L_m^i(y^i = N | x^i) = \frac{\exp(-d(f_\phi^h(x^i), Class_N))}{\sum_{N'} \exp(-d(f_\phi^h(x^i), Class_{N'}))} \quad (7)$$

Which measures the loss that the metric loss computation unit 316 correctly classifies a data sample $x^i$ of S, which is $S_{query}$ in this scenario. Equation (7) may be reads as provided the data sample $x^i$, what's the loss that class label ($y^i$) of data sample $x^i$ is classified as its correct class N. $f_\phi(x^i)$ is the query set feature map of the data sample ($x^i$), $Class_N$ is the prototype of class N. N' is a set of all classes other than class N.

The metric classification loss $L_m$ of all data samples in S, which is $S_{query}$ is this instance, can be computed as in equation (8) below.

$$L_m = \sum_{i \in S} L_m^i \quad (8)$$

The $L_m$ generated for $S_{query}$ denoted as $L_{m-query}$.

All query set feature maps $f_\phi^h$ 310 are fed into the decoder 308 to reconstruct their respective data samples ($x_{rec}$) of $S_{query}$ generating query set reconstructed dataset, stored in the reconstructed database 314. The query set reconstruction loss $L_{query-rec}$ is determined by comparing each data sample of the query set reconstructed dataset with its respective data sample in $S_{query}$ as in equation (9) below.

$$L_{query-rec} = \frac{1}{n} \sum_i^n (x^i - x_{rec}^i)^2 \quad (9)$$

where $x^i$ is an element of $S_{query}$ and $x_{rec}^i$, is $x^i$'s respective reconstructed data sample in the query set reconstructed dataset.

The query set reconstructed dataset is added to database 304 then fed to the encoder 306 to generate query set reconstructed feature maps $f_\phi^h$ 310. The metric classification loss $L_m^i$ of each data sample $x_{rec}^i$ is computed as in equation (7) then aggregated as in equation (8), calculating the metric classification loss $L_m$ for the query set reconstructed data, determining the query set reconstructed metric classification loss denoted as $L_{m-rec}$.

The weighted sum of all losses ($L_{m-query}$, $L_{m-rec}$, $L_{query-rec}$, and $L_{support-rec}$) is the fine-tuning stage loss ($L_{fine-tuning}$) of an iteration, computed as in equation (10) below.

$$L_{fine-tuning} = \lambda_1 L_{m-query} + \lambda_2 L_{m-rec} + \lambda_3 L_{query-rec} + \lambda_4 L_{support-rec} \quad (10)$$

where $\lambda_1 + \lambda_2 + \lambda_3 + \lambda_4 = 1$. $L_{fine-tuning}$ is backpropagated to update the autoencoder's 302 parameters (i.e., weights and biases (if any)). It is to be understood that while $L_{query-rec}$ and $L_{support-rec}$ are calculated in two separate steps, example embodiments may pool their data samples (query set reconstructed dataset and support set reconstructed dataset) and calculate a single reconstruction loss as in any of equations (6) or (9).

Figure 5:
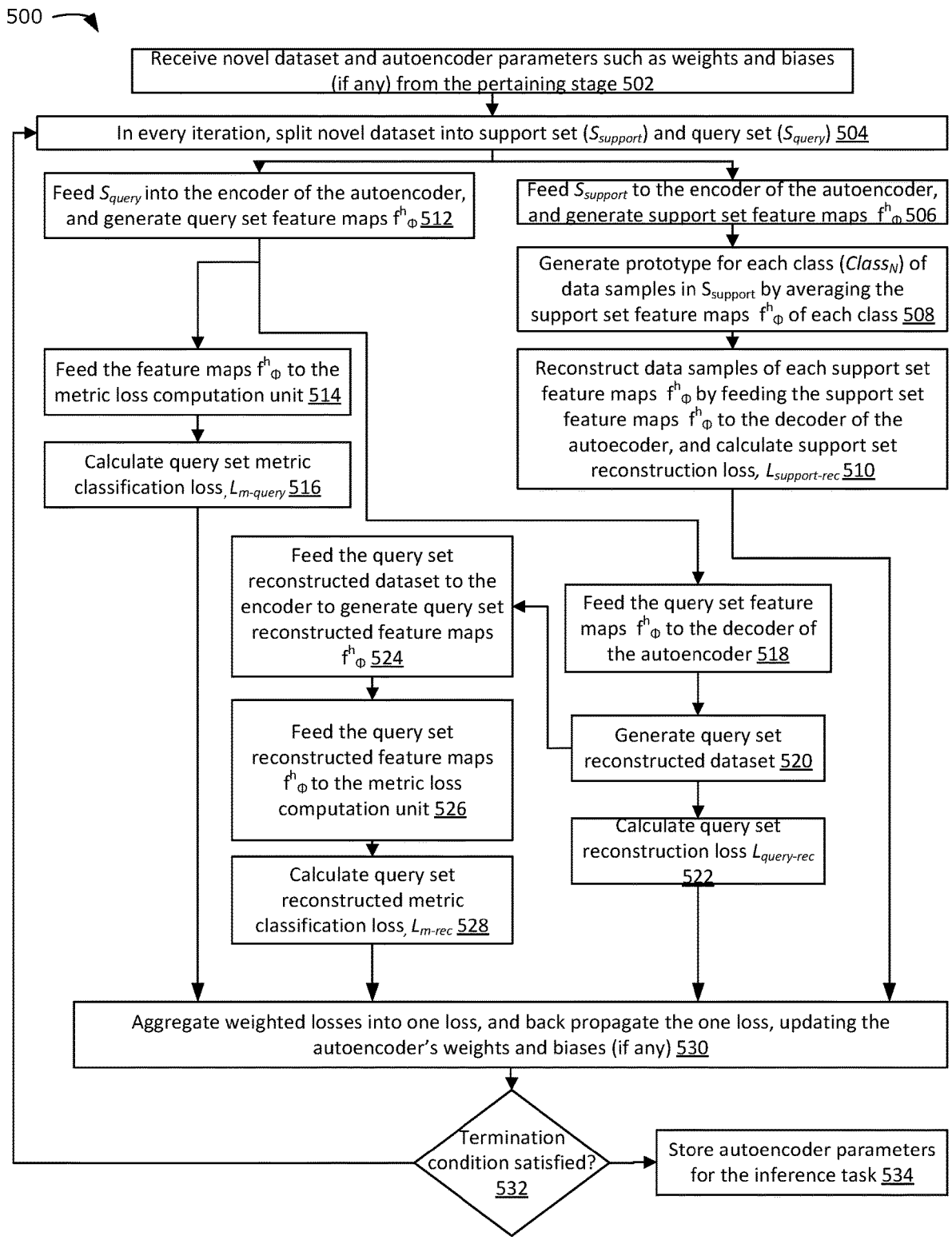
FIG. 5 is a flowchart of an example fine-tuning stage method for an autoencoder's training for a few-shot classification task, in accordance with an example embodiment.

FIG. 5 is a flowchart of an example fine-tuning method 500 of the autoencoder 302, according to example embodiments. The fine-tuning method 500 is subsequent to the pretraining method 400 of FIG. 4. It trains the autoencoder 302 to learn the novel dataset consisting of a few data samples of each class. The method 500 receives the autoencoder 302 parameters (weights and biases (if any)) trained in the pretraining stage and receives the novel dataset 502. In every training iteration, the method 500 splits the novel dataset into two disjoint sets, $S_{support}$ and $S_{query}$, where data samples of each class are split between the disjoint sets 504. Some scenarios split the data samples of the novel dataset evenly between $S_{support}$ and $S_{query}$, but other scenarios may not.

The $S_{support}$ is fed into the encoder 306 of the autoencoder 302 to generate the support set feature maps $f_\phi^h$ 310 at block 506. Using the metric loss computation unit 316, the method 500 generates a prototype for each class of the N classes of the novel dataset 508. The prototype of class N, $Class_N$, is the average of the support set feature maps $f_\phi^h$ 310 of each class in $S_{support}$. The support set feature maps $f_\phi^h$ 310 are fed into the decoder 308 of the autoencoder 302 to reconstruct the respective data sample of each support set feature map $f_\phi^h$ 310, generating a support set reconstructed dataset 508. The method 500 uses the support set reconstructed dataset to compute the support set reconstruction loss ($L_{support-rec}$) as in equation (6) 510.

Further, the method 500 feeds $S_{query}$ to the encoder 306, and generates the query set feature maps $f_\phi^h$ 310 at block 514. These query set feature maps $f_\phi^h$ 310 are first fed to the metric loss computation unit 316 at block 516. The method 500, through the metric loss computation unit 316, calculates a query set metric classification loss $L_{m-query}$, determined by equations (7) and (8) above.

The query set feature maps $f_\phi^h$ 310 are also fed to the decoder 308 of the autoencoder 302 at block 518 to reconstruct the data samples from each query set feature map $f_\phi^h$ 310, generating query set reconstructed dataset, stored in reconstructed database 314 at block 520. The method 500 then calculates the query set reconstruction loss $L_{query-rec}$ by comparing each data sample of the query set reconstructed dataset with its respective data sample in $S_{query}$, determined as in equation (9) above 522. Further, the query set reconstructed dataset is fed to the encoder 306 to generate the query set reconstructed feature maps $f_\phi^h$ 310 at block 524. The query set reconstructed feature maps $f_\phi^h$ 310 are fed to the metric loss computation unit 316 at block 526 to calculate query set reconstructed metric classification loss, $L_{m-rec}$, by computing equations (7) and (8) with the S being query set reconstructed dataset 528.

The losses $L_{m-query}$, $L_{m-rec}$, $L_{support-rec}$, and $L_{query-rec}$ are weighted and aggregated, generating the fine-tuning stage loss ($L_{fine-tuning}$) computed as in equation (10) above. $L_{fine-tuning}$ is backpropagated updating the weights and biases (if any) of the autoencoder 302 in this iteration.

The fine-tuning stage training continues until a termination condition is satisfied 532. The termination condition may be satisfied by reaching a prespecified number of epochs or a training error. If the termination condition is satisfied 532, training halts, and the autoencoder 302 is trained and may be used for the classification task.

Figure 6:
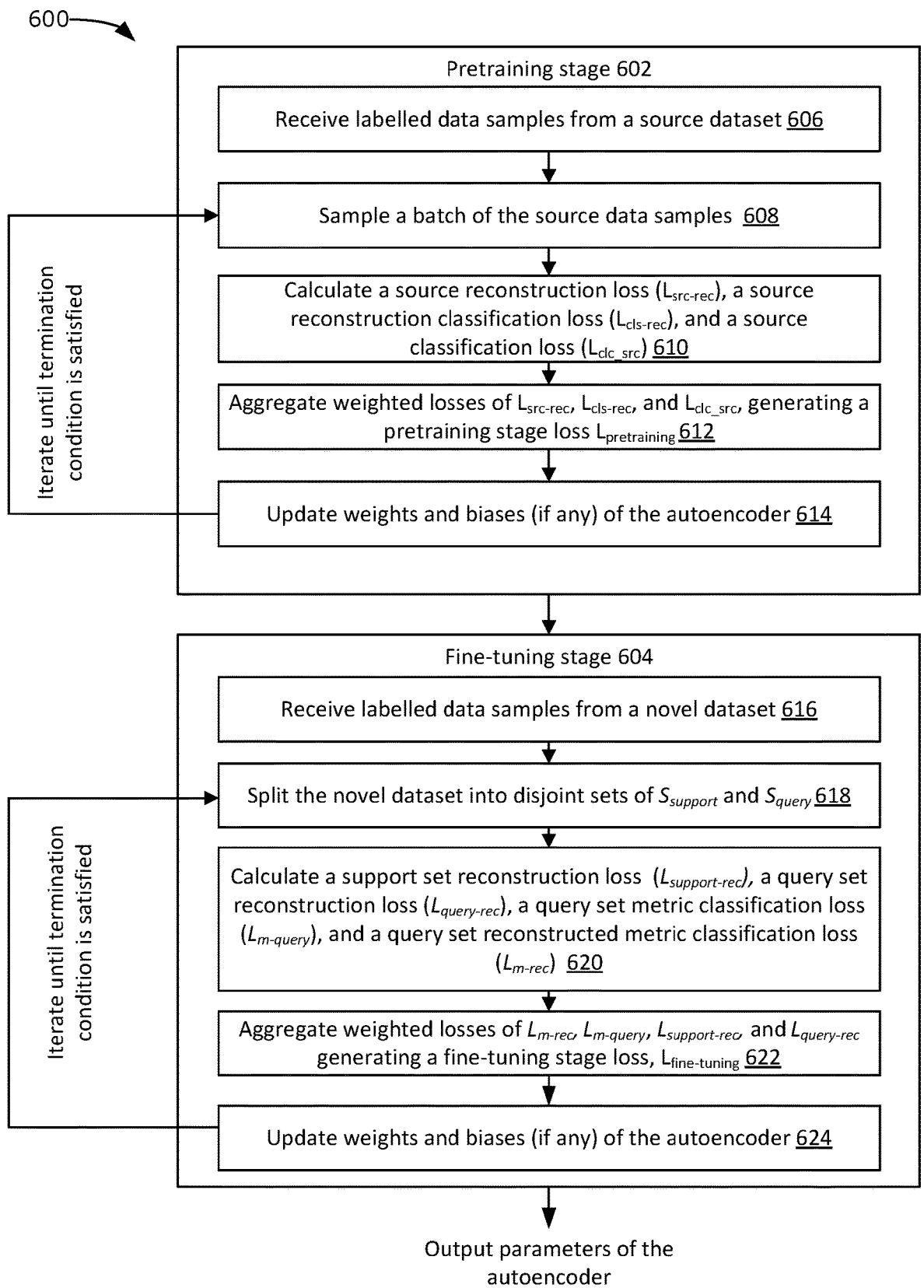
FIG. 6 is a flowchart of an example autoencoder training method for a few-shot classification task, in accordance with an example embodiment.

FIG. 6 is a flowchart of an example training method 600 for training the autoencoder 302, according to example embodiments. The training method 600 includes two stages, the pretraining stage 602 and the fine-tuning stage 604. The pretraining stage 602 receives labelled data samples from a source dataset 606, and in each training iteration, the method 600 samples a batch of data samples from the source dataset 608. The method 600 subsequently calculates a source reconstruction loss ($L_{src-rec}$), a source reconstruction classification loss ($L_{cls\text{-}rec}$), and a source classification loss a ($L_{cls\text{-}src}$) 610. The losses are then weighted and aggregated, generating a total loss $L_{pretraining}$ 612, which updates the autoencoder 302 parameters accordingly 614. The pretraining stage 602 continues until a termination condition is satisfied, in which the fine-tuning stage 604 starts.

The fine-tuning stage 604 receives labelled data samples from a novel dataset 616, and in each iteration, the method 600 splits the novel dataset into two disjoint sets of $S_{support}$ and $S_{query}$ 618. The method 600 then calculates a support set reconstruction loss ($L_{support\text{-}rec}$) a query set reconstruction loss ($L_{query\text{-}rec}$), a query set metric classification loss ($L_{m\text{-}query}$), and a query set reconstructed metric classification loss ($L_{m\text{-}rec}$) 620. The method 600 aggregates a weighted sum of the losses $L_{m\text{-}query}$, $L_{m\text{-}rec}$, $L_{querry\text{-}rec}$, and $L_{support\text{-}rec}$, generating a fine-tuning stage loss $L_{fine\text{-}tuning}$ 622, which updates the autoencoder 302 parameters accordingly 624. The fine-tuning stage 604 continues until a termination condition is satisfied, in which the autoencoder 302 training is complete.

Figure 7:
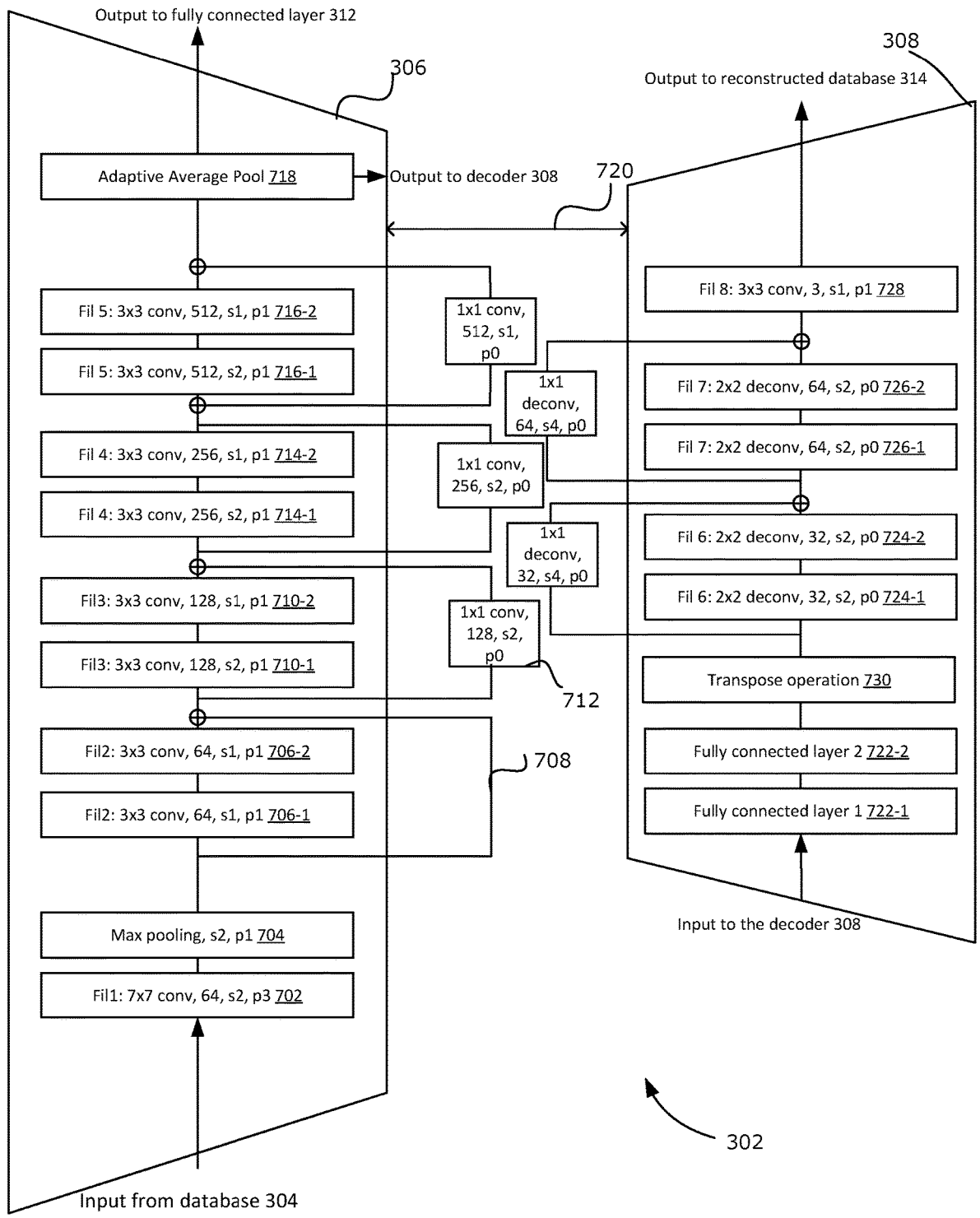
FIG. 7 is a block diagram of an example encoder and decoder of an autoencoder configured for a few-shot classification task, in accordance with an example embodiment.

FIG. 7 is a block diagram of an autoencoder 302, according to example embodiments. The encoder 306 implements a residual neural network of 10 layers (convolutional layers) (ResNet10) as in "He, Kaiming, et al. 'Deep residual learning for image recognition.' Proceedings of the IEEE Conference on Computer Vision and Pattern Recognition. 2016," incorporated herein in its entirety by reference. The encoder 306 receives the input from the database 304, into fil1 702, which is a convolutional layer using 64 filters of size 7×7 pixels each, with a stride of 2 and padding of 3. Stride describes how the filter convolves the input. A filter with stride 2 (s2) means the filter computes convolution by shifting 2 pixels at a time. Therefore, it downsamples the input by half. The padding of 3 (p3) means the filter appends 3 pixels around the input, increasing its size by 6 pixels in each dimension before performing the convolution. Max pooling 704 is a computation unit that further downsamples its input by considering a filter of size 2×2 s2, p1 that convolves with the output of fil1 702 and outputs the maximum value of every 2×2 matrix.

Fil2 706-1 fil2 706-2 are convolutional layers, each of 64 filters of 3×3 pixels, and s2 and p1. Fil2 706-1 is applied to the output of max pooling 704, and 706-2 is applied to the output of fil2 706-1. There are skip connections, only one of which is labelled as 708. The skip connection 708 imposes a piecewise sum of the input to fil2 706-1 with the output of fil2 706-2. The summed output is fed to fil3 (710-1 and 710-2). Fil3 710-1 and fil3 710-2 are convolutional layers, each of 128 filters of size 3×3 pixels. Fil3 710-1 is configured with s2 and p1 while fil3 710-2 is configured with s1 and p1. The operation of fil3 is similar to fil2; however, the skip connection 708 of fil3 has a computation unit (1×1 conv, 128, s2, p0) labelled as 712. The computation unit 712 consists of 128 filters of size 1×1 pixel each. The input to fil3 710-1 has 64 feature maps f while the output of fil3 710-2 has 128 feature maps $f_\phi^h$ 310; therefore, it may not be possible to piecewise add the input of fil3 710-1 to the output of fil3 710-2. The convolutional layer (1×1 conv, 128, s2, p0) 712 increases the 64 feature maps $f_\phi^h$ 310 output to 128 feature maps $f_\phi^h$ 310, enabling piecewise addition.

Similar operations are performed for fil4 (714-1 and 714-2) and fil5 (716-1 and 716-2). Each of fil4 (714-1 and 714-2) and fil5 (716-1 and 716-2) has its respective skip connection 708. Fil4 714-1 and fil4 714-2 are convolutional layers, each of 256 filters of size of 3×3 pixels. Fil 714-1 is configured with s2 and p1, and fil4 714-2 is configured with s1 and p1. Fil5 716-1 and fil5 716-2 are convolutional layers, each of 512 filters of size 3×3 pixels. Fil5 716-1 is configured with s2 and p1, and fil 5 716-2 is configured with s1 and p1.

Each of fil1, fil2, fil3, fil4 and fil5 may implement a normalization method, which changes data into a common scale for faster convergence during training, and an activation function, which ensures values that are passed on to a subsequent computation unit within a tunable, expected range. The normalization method may be batch normalization, layer normalization, group normalization, and the activation functions may be ReLU, sigmoid, tanh, etc. The example embodiment of FIG. 7 implements ResNet of the abovementioned "He, Kaiming, et al. 'Deep residual learning for image recognition.' Proceedings of the IEEE Conference on Computer Vision and Pattern Recognition. 2016." It also implements batch normalization and ReLU activation function.

Adaptive average pooling 718 is a computation unit of a filter that outputs a desired feature map $f_\phi^h$ 310 size. Its underlying operations calculate a specific stride and filter size, and for each filter operation, it calculates the average of its input. The adaptive average pooling 718 output is fed to the decoder 308, where the input is reconstructed, and to the fully connected layer 312, where all feature maps $f_\phi^h$ 310 are flattened and classified with their predicted class labels. The encoder 306 and the decoder 308 are connected with a bus 720 for transferring data between them, including propagating data forward and backward as part of the backpropagation training method.

The decoder 308 in FIG. 7 is a lightweight CNN architecture which can be seen as an inverse mapping of the encoder 306. Several layers are deconvolutional layers. The input data, which consists of the feature maps $f_\phi^h$ 310 of the encoder 306, are fed to a fully connected layer 1 722-1 and a fully connected layer 2 722-2. The output of the fully connected layer 2 722-2 is transposed by transpose operation 730 and fed to fil6 (724-1 and 724-2) which is a set of deconvolutional layers. Deconvolution layers are similar to the convolutional layers convolutional filters in fil1 (702) to fil5 (716-1 and 716-2) and may not reverse the effect of convolution. Fil6 724-1 and fil6 724-2 are deconvolutional layers, each using 32 filters of size 2×2 pixels and configured with s2, p0. Fil6 724-1 and fil6 724-2 have a skip connection 708, which is a deconvolutional layer (1×1 deconv, 32, s4, p0), to increase the number of feature maps $f_\phi^h$ 310 to 32 and allow the input to fil6 724-1 to be piecewise added to the output of fil6 724-2 before feeding it to fil7 726-1. Fil7 726-1 and fil7 726-2 are deconvolutional layers, each of 64 filters of size 2×2 pixels and configured with s2 and p0. Fil7 (726-1 and 726-2) has a skip connection 708 with a convolutional layer of 64 convolutional filters of size 1×1 pixel, configured with s4 and p0, to increase the number of feature maps f 310, allowing for piecewise addition between the input to fil7 726-1 and the output of fil7 726-2. Fil8 728 is a convolutional layer of 3 filters of size 3×3 pixels configured with S1 and p1. It transforms its input of 64 feature maps f to 3 feature maps $f_\phi^h$ 310, corresponding to the reconstructed data samples of each input to the encoder 306. The three feature maps $f_\phi^h$ 310 are the RGB channels of the reconstructed data samples. The output of the decoder 308 is stored in the reconstructed database 314.

It is to be understood that the choice of using ResNet for the encoder 306 and lightweight CNN for the decoder 308 is provided as an example and is not a limitation. Other machine learning architectures may be used, to name a few: LeNet-5 in "LeCun, Yann, et al. 'Gradient-based learning applied to document recognition.' Proceedings of the IEEE 86.11 (1998): 2278-2324.", incorporated herein in its entirety by reference; AlexNet in "Krizhevsky, Alex, Ilya Sutskever, and Geoffrey E. Hinton. 'Imagenet classification with deep convolutional neural networks.' Advances in Neural Information Processing Systems 25 (2012): 1097-1105.", incorporated herein in its entirety by reference; ZFNet in "Zeiler, Matthew D., and Rob Fergus. 'Visualizing and understanding convolutional networks.' European Conference on Computer Vision. Springer, Cham, 2014.", GoogleLeNet in "Szegedy, Christian, et al. 'Going deeper with convolutions.' Proceedings of the IEEE Conference on Computer Vision and Pattern Recognition. 2015.", incorporated herein in its entirety by reference.

Experimentation

FIG. 8 is an evaluation table of the autoencoder 302 of FIG. 7 trained on novel datasets and compared to previous works, according to example embodiments. The datasets ChestX, ISIC, EuroSAT and CropDisease in "Guo, Yunhui, et al. 'A Broader Study of Cross-Domain Few-Shot Learning.' European Conference on Computer Vision. Springer, Cham, 2020," incorporated herein in its entirety by reference, were used as novel datasets. The mini-ImageNet dataset was used as a source dataset for pretraining.

Experiments are implemented with pytorch™. In the pretraining stage, a batch size of 64 data samples for 400 epochs were used. Also, stochastic gradient descent was used in backpropagation. In the fine-tuning stage, 200 epochs and stochastic gradient descent was used as well. For each novel dataset, 5 class labels were selected with 20 data samples of each class label. In each iteration, 3 data samples of each class label were used for $S_{support}$ and 2 data samples were used for $S_{query}$. The other 15 data samples were used to evaluate performance.

The disclosed methods may be carried out by modules, routines, or subroutines of software executed by the processing unit(s) 100. Coding of software for carrying out the steps of the methods is well within the scope of a person of ordinary skill in the art having regard to the described methods, systems, and media. These methods may contain additional or fewer steps than shown and described, and the steps may be performed in a different order. Computer-readable instructions, executable by the processor(s) of the processing unit 100, may be stored in the memory 110 of the processing unit, or a computer-readable medium. It is to be emphasized that the steps of the methods need not be performed in the exact sequence as shown unless otherwise indicated; and likewise, various steps of the methods may be performed in parallel rather than in sequence.

It can be appreciated that the methods of the present disclosure, once implemented, can be performed by the processing unit(s) 100 in a fully-automatic manner, which is convenient for users to use as no manual interaction is needed.

It should be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments described, it should be understood that the disclosed systems and methods may be implemented in other manners. For example, the described system embodiments are merely examples. Further, units or components may be combined or integrated into another system, or some features may be ignored or not performed. In addition, the displayed or discussed mutual couplings or direct couplings or communication connections may be implemented by using some interfaces. The indirect couplings or communication connections between the systems or units may be implemented in electronic, mechanical, or other forms.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices, and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations but are not intended to limit the scope of protection. Any variation or replacement readily figured out by a person skilled in the art within the technical scope shall fall within the scope of protection. Therefore, the scope of protection shall be subject to the protection scope of the claims.

The invention claimed is:

1. A method for cross-domain few-shot classification through training of an autoencoder comprising an encoder and a decoder of a deep neural network, the method comprising:
    receiving training datasets comprising a source dataset and a novel dataset, each dataset comprising a plurality of data samples, each data sample being labelled with a class label;

training the autoencoder using a first training stage, for each training iteration:
  sampling a batch of data samples from the source dataset and feed the batch to the encoder to generate a plurality of source feature maps;
  feeding the plurality of source feature maps to a fully connected layer to predict the class label of each source feature map of the plurality of source feature maps, then calculate a source classification loss;
  feeding the plurality of source feature maps to the decoder to reconstruct the respective data sample of each source feature map to generate a source reconstructed dataset, then calculating a source reconstruction loss;
  calculating a first training stage loss based on the source classification loss and the source reconstruction loss; and
  updating parameters of the autoencoder using the first training stage loss;
training the autoencoder using a second training stage, for each training iteration:
  splitting the novel dataset into a support set and a query set;
  feeding the support set to the encoder to generate a plurality of support set feature maps used to determine a prototype for each class label in the plurality of support set feature maps;
  feeding the query set to the encoder to generate a plurality of query set feature maps, then calculate a query set metric classification loss, which is a second training stage loss; and
  updating the parameters of the autoencoder using the second training stage loss; and
using the trained autoencoder to perform an inference task that comprises a cross-domain few-shot classification task.

2. The method of claim 1, wherein the first training stage further comprises:
  feeding the source reconstructed dataset to the encoder to generate a plurality of source reconstructed feature maps;
  feeding the plurality of source reconstructed feature maps to the fully connected layer to predict the class label of each source reconstructed feature map of the plurality of source reconstructed feature maps, then calculating a source reconstruction classification loss; and
  adding the source reconstruction classification loss to the first training stage loss.

3. The method of claim 1, wherein the first training stage loss is an aggregated weighted sum of the losses comprising it.

4. The method of claim 1, wherein the second training stage further comprises:
  feeding the plurality of support set feature maps to the decoder to reconstruct the respective data sample of each support set feature map, generating a support set reconstructed dataset, then calculating a support set reconstruction loss; and
  adding the support set reconstruction loss to the second training stage loss.

5. The method of claim 4, wherein the second training stage loss is an aggregated weighted sum of the losses comprising it.

6. The method of claim 1, wherein the second training stage further comprises:
  feeding the plurality of query set feature maps to the decoder to reconstruct the respective data sample of each query set feature map, generating a query set reconstructed dataset, then calculating a query set reconstruction loss; and
  adding the query set reconstruction loss to the second training stage loss.

7. The method of claim 6, further comprising:
  feeding the query set reconstructed dataset to the encoder to generate a plurality of query set reconstructed feature maps, then calculating a query set reconstructed metric classification loss; and
  adding the query set reconstructed metric classification loss to the second training stage loss.

8. The method of claim 1, wherein at least one of a source reconstructed dataset or a query set reconstructed dataset augments the training datasets.

9. The method of claim 1, wherein the novel dataset and the source dataset are of different domains.

10. A system for cross-domain few-shot classification through training of an autoencoder comprising an encoder and a decoder of a deep neural network, the system comprising:
  a memory storing instructions;
  one or more processors coupled to the memory and configured to execute the instructions to:
    receive training datasets comprising a source dataset and a novel dataset, each dataset comprising a plurality of data samples, each data sample being labelled with a class label;
    train the autoencoder using a first training stage, for each training iteration:
      sample a batch of data samples from the source dataset and feed the batch to the encoder to generate a plurality of source feature maps;
      feed the plurality of source feature maps to a fully connected layer to predict the class label of each source feature map of the plurality of source feature maps, then calculate a source classification loss;
      feed the plurality of source feature maps to the decoder to reconstruct the respective data sample of each source feature map to generate a source reconstructed dataset, then calculate a source reconstruction loss; and
      calculate a first training stage loss based on the source classification loss and the source reconstruction loss; and
      update parameters of the autoencoder using the first training stage loss;
    train the autoencoder using a second training stage, for each training iteration:
      split the novel dataset into a support set and a query set;
      feed the support set to the encoder to generate a plurality of support set feature maps used to determine a prototype for each class label in the plurality of support set feature maps;
      feed the query set to the encoder to generate a plurality of query set feature maps, then calculate a query set metric classification loss, which is a second training stage loss; and
      update the parameters of the autoencoder using the second training stage loss; and
    use the trained autoencoder to perform an inference task that comprises a cross-domain few-shot classification task.

11. The system of claim 10, wherein the one or more processors are further configured for the first training stage to execute the instructions to:
feed the source reconstructed dataset to the encoder to generate a plurality of source reconstructed feature maps;
feed the plurality of source reconstructed feature maps to the fully connected layer to predict the class label of each source reconstructed feature map of the plurality of source reconstructed feature maps, then calculate a source reconstruction classification loss; and
add the source reconstruction classification loss to the first training stage loss.

12. The system of claim 10, wherein the first training stage loss is an aggregated weighted sum of the losses comprising it.

13. The system of claim 10, wherein the one or more processors are further configured for the second training stage to execute the instructions to:
feed the plurality of support set feature maps to the decoder to reconstruct the respective data sample of each support set feature map, generating a support set reconstructed dataset, then calculate a support set reconstruction loss; and
add the support set reconstruction loss to the second training stage loss.

14. The system of claim 13, wherein the second training stage loss is an aggregated weighted sum of the losses comprising it.

15. The system of claim 10, wherein the one or more processors are further configured for the second training stage to execute the instructions to:
feed the plurality of query set feature maps to the decoder to reconstruct the respective data sample of each query set feature map, generating a query set reconstructed dataset, then calculate a query set reconstruction loss; and
add the query set reconstruction loss to the second training stage loss.

16. The system of claim 15, wherein the one or more processors are further configured for the second training stage to execute the instructions to:
feed the query set reconstructed dataset to the encoder to generate a plurality of query set reconstructed feature maps, then calculate a query set reconstructed metric classification loss; and
add the query set reconstructed metric classification loss to the second training stage loss.

17. The system of claim 10, wherein at least one of a source reconstructed dataset or a query set reconstructed dataset augments the training datasets.

18. A non-transitory computer-readable medium having instructions tangibly stored thereon for cross-domain few-shot classification through training of an autoencoder comprising an encoder and a decoder of a deep neural network, wherein the instructions, when executed by a processing unit, causes the processing unit to:
receive training datasets comprising a source dataset and a novel dataset, each dataset comprising a plurality of data samples, each data sample being labelled with a class label;
train the autoencoder using a first training stage, for each training iteration:
sample a batch of data samples from the source dataset and feed the batch to the encoder to generate a plurality of source feature maps;
feed the plurality of source feature maps to a fully connected layer to predict the class label of each source feature map of the plurality of source feature maps, then calculate a source classification loss;
feed the plurality of source feature maps to the decoder to reconstruct the respective data sample of each source feature map to generate a source reconstructed dataset, then calculate a source reconstruction loss;
calculate a first training stage loss based on the source classification loss and the source reconstruction loss; and
update parameters of the autoencoder using the first training stage loss;
train the autoencoder using a second training stage, for each training iteration:
split the novel dataset into a support set and a query set;
feed the support set to the encoder to generate a plurality of support set feature maps used to determine a prototype for each class label in the plurality of support set feature maps;
feed the query set to the encoder to generate a plurality of query set feature maps, then calculate a query set metric classification loss, which is a second training stage loss; and
update the parameters of the autoencoder using the second training stage loss; and
use the trained autoencoder to perform an inference task that comprises a cross-domain few-shot classification task.

* * * * *

UNITED STATES PATENT AND TRADEMARK OFFICE
CERTIFICATE OF CORRECTION

PATENT NO. : 12,217,187 B2  
APPLICATION NO. : 17/204670  
DATED : February 4, 2025  
INVENTOR(S) : Hanwen Liang et al.

It is certified that error appears in the above-identified patent and that said Letters Patent is hereby corrected as shown below:

In the Specification

Column 11, Line 10:

"decode the deepest feature map $f_{99}{}^h$ 310" should read -- decode the deepest feature map $f_\phi^h$ 310 --

Column 14, Line 28:

"support set feature maps $f_{99}{}^h$ 310" should read -- "support set feature maps $f_\phi^h$ 310 --

Signed and Sealed this  
Eighteenth Day of March, 2025

Coke Morgan Stewart  
*Acting Director of the United States Patent and Trademark Office*